US012156842B2

(12) United States Patent
Gutierrez Hilty

(10) Patent No.: US 12,156,842 B2
(45) Date of Patent: Dec. 3, 2024

(54) FACE MASSAGING DEVICE

(71) Applicant: Yvette Gutierrez Hilty, Carmichael, CA (US)

(72) Inventor: Yvette Gutierrez Hilty, Carmichael, CA (US)

( * ) Notice: Subject to any disclaimer, the term of this patent is extended or adjusted under 35 U.S.C. 154(b) by 310 days.

(21) Appl. No.: 17/515,612

(22) Filed: Nov. 1, 2021

(65) Prior Publication Data

US 2022/0395424 A1 Dec. 15, 2022

Related U.S. Application Data

(60) Provisional application No. 63/208,560, filed on Jun. 9, 2021.

(51) Int. Cl.
*A61H 15/00* (2006.01)
*A61H 23/02* (2006.01)

(52) U.S. Cl.
CPC ......... *A61H 15/0085* (2013.01); *A61H 23/02* (2013.01); *A61H 2201/1207* (2013.01); *A61H 2201/1685* (2013.01); *A61H 2201/1692* (2013.01); *A61H 2201/5025* (2013.01); *A61H 2205/022* (2013.01)

(58) Field of Classification Search
CPC ........ A61H 15/0085; A61H 2015/0042; A61H 2015/1215; A61H 2015/0071; A61H 2015/5025; A61H 2015/1685; A61H 2015/1692; A61H 2015/1207; A61H 2205/022; A61H 23/02; A61H 2201/1207; A61H 2201/1671; A61H 2201/5052
See application file for complete search history.

(56) References Cited

U.S. PATENT DOCUMENTS

| | | | | |
|---|---|---|---|---|
| 4,722,326 A * | 2/1988 | Ruderian .......... | A61M 37/0092 401/209 |
| 6,241,696 B1 * | 6/2001 | York .................. | A61H 15/0092 601/131 |
| 2006/0089578 A1 * | 4/2006 | Hsu ........................ | A61H 15/00 601/118 |
| 2006/0276732 A1 * | 12/2006 | Chen .................. | A61H 15/0092 601/129 |

(Continued)

FOREIGN PATENT DOCUMENTS

CN 112315764 A * 2/2021 ......... A61H 15/0092

*Primary Examiner* — Bradley H Philips
*Assistant Examiner* — Savannah L Gabriel
(74) *Attorney, Agent, or Firm* — Brennan, Manna & Diamond, LLC

(57) ABSTRACT

The present invention is a hand-held, battery operated facial massager. The facial massager includes a palm-sized base unit and one or more interchangeable heads. Each interchangeable head is designed to attach to the base unit, and is designed to provide a specific type of motion. The facial massager is adjustable for different facial areas and locations on a user's face and neck. The facial massager of the present invention can be manufactured and sold as a kit having one base unit, several interchangeable heads and a battery charger. The simple and compact design of the facial massager allows a user to perform a complete facial massage in the comfort of their home, instead of having to rely on costly and time-consuming professional appointments at a salon.

12 Claims, 6 Drawing Sheets

(56) References Cited

U.S. PATENT DOCUMENTS

| | | | | |
|---|---|---|---|---|
| 2010/0160841 | A1* | 6/2010 | Wu | A61H 7/004 601/134 |
| 2012/0253248 | A1* | 10/2012 | Carlson | A61H 15/00 601/128 |
| 2014/0228723 | A1* | 8/2014 | Cockerill | A61H 15/0092 601/128 |
| 2017/0035648 | A1* | 2/2017 | Frank | A61H 15/0085 |
| 2018/0116903 | A1* | 5/2018 | Matsushita | A61H 7/003 |
| 2018/0140500 | A1* | 5/2018 | Matsushita | A61H 15/0092 |
| 2019/0350793 | A1* | 11/2019 | Wersland | A61H 23/006 |
| 2020/0237610 | A1* | 7/2020 | Courtion | A61H 23/004 |
| 2020/0383867 | A1* | 12/2020 | Matsushita | A61H 15/0092 |
| 2021/0031030 | A1* | 2/2021 | Min | A61N 1/328 |
| 2021/0369549 | A1* | 12/2021 | Almodovar | A61H 15/0092 |

* cited by examiner

FACE MASSAGING DEVICE

CROSS-REFERENCE TO RELATED APPLICATION

The present application claims priority to, and the benefit of, U.S. Provisional Application No. 63/208,560, which was filed on Jun. 9, 2021 and is incorporated herein by reference in its entirety.

FIELD OF THE INVENTION

The present invention relates generally to the field of facial massage devices. More specifically, the present invention relates to an improved facial massager that includes several interchangeable heads for providing a variety of massaging functions. The improved facial massager device is designed to be handheld, fitting into a user's palm, and comprises a variety of settings including rotation speed, intensity and pulsation. The interchangeable heads provide different types of motion, and can be formed as a single or dual head applicator. Further, the interchangeable heads can include replaceable head covers having smooth, raised or textured surfaces. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, facial massages are commonly performed by professionals at beauty salons and the like to help reduce signs of aging including wrinkles, sagging skin, droopy mouth and eye puffiness. In addition, certain facial massages can be used to reduce the occurrence of headaches, migraines and other health-related issues. However, massage and acupressure tools are generally used by professionals, thus requiring an appointment to seek treatment. Further, repeated massage treatments can be time-consuming and costly for a user. In addition, several specialized massage tools are needed to address various aging and health-related issues. Additionally, some treatments require the facial skin to be relaxed, while other treatments require the facial skin to be tightened. This may require different types of massage tools, depending on the desired outcome. Further, different areas of the face may require different types of stimulation to achieve the desired results. This too may require additional massage tools depending on the area of the user's face.

Therefore, there exists a long felt need in the art for an improved facial massager device that is handheld and battery-operated. There is also a long felt need in the art for an improved facial massager device that can be easily converted from one massaging head attachment to another, based on the needs and/or desires of the user. Additionally, there is a long felt need in the art for an improved facial massager device that can have interchangeable head covers having smooth, uneven, or textured surfaces for providing different massaging effects. Further, there is a long felt need in the art for an improved facial massager device that can have differing head movements and intensities based on the needs and/or desires of the user. Further, there is a long felt need in the art for an improved facial massager device that is adjustable for the different facial contours and areas of a user's face and neck. Finally, there is a long felt need in the art for an improved facial massager device that is relatively inexpensive to manufacture, and that can be sold in a kit comprising a variety of interchangeable heads and covers, along with a battery-operated handheld base.

The subject matter disclosed and claimed herein, is an improved facial massager device that is designed to be handheld, lightweight and battery-operated. The improved facial massager device comprises a palm-sized base unit and one or more interchangeable heads. The base unit further comprises a motor, a rechargeable battery and switches/circuitry necessary for controlling the various massaging functions. Each interchangeable head is designed to attach to the base unit and to provide a specific type of motion, which is transferred to the interchangeable head via rotational motion generated by the base unit's motor. Each interchangeable head can be lengthened and adjusted to accommodate a variety of facial contours and areas. In addition, the novel interchangeable heads can have a single or dual head applicator. Each head applicator can also rotate based on a user's selection of the settings on the base unit. Further, each head applicator can include replaceable covers having smooth or textured surfaces.

In this manner, the improved facial massager device of the present invention accomplishes all of the forgoing objectives, while providing a quick and easy solution for providing facial massages at home without having to reply on a professional salon. The improved facial massager device of the present invention is also user-friendly and versatile, as it includes a plurality of interchangeable head configurations, thereby eliminating the need to purchase several different massaging tools. The improved facial massager device of the present invention can be manufactured and sold as a kit comprising a single base unit, a plurality of interchangeable heads and a battery charger.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an improved facial massager device comprising a palm-sized base unit and one or more interchangeable heads. The base unit further comprises a motor, a rechargeable battery and the electrical circuitry necessary for controlling the various massaging functions. The base unit includes a speed selector switch for controlling the speed of the internal motor. Further, the different speed settings may include off, low, medium and high. The internal battery is recharged using an external plug-in transformer charger. Further, at the top end of the base unit, the head attachment location includes a rotary spindle, having a square profile for mating to a complimentary sized and shaped flexible shaft on the interchangeable heads. The base unit may be manufactured from any suitable material including hard plastic, and may further include rubber finger grips for holding the base unit while using the novel improved facial massager device.

In this embodiment, the interchangeable head of the present invention is a single rotary head having a rotary ball on the applicator end that is driven by its flexible shaft. The rotary ball includes a threaded portion about its circumference for attaching a replaceable cap, which also includes a threaded portion. When the replaceable cap is screwed onto the rotary ball, the rotary ball and replaceable cap will spin when the motor on the base unit is activated. The replaceable cap may include a variety of different surfaces including smooth, uneven or raised spherical ball-like features, wherein each replaceable cap provides a different sensation and result for the user when using the improved facial massager device. The interchangeable head of the present invention further includes a bend/extension portion that is adjacent to the applicator end and can be either extended or bent for massaging different facial contours and areas. The interchangeable head further includes a flexible shaft for connecting to the rotary ball.

In another embodiment, the interchangeable head of the present invention is a dual rotary head having a rotary ball on each of the two applicator ends that are simultaneously driven by its flexible shaft. Each rotary ball includes a threaded portion about its circumference for attaching a replaceable cap, which also includes a threaded portion. When the replaceable caps are screwed onto the rotary balls, each rotary ball and replaceable cap will spin when the motor on the base unit is activated. The replaceable caps may include a variety of surfaces including smooth, uneven or raised spherical ball-like features, wherein each replaceable cap provides a different sensation and result for the user when using the improved facial massager device. The interchangeable head of this embodiment of the present invention further includes bend/extension portions that are adjacent to each applicator end and can be either extended or bent for massaging different facial contours and areas. The interchangeable head further includes a flexible shaft for connecting to each of the rotary balls.

In another embodiment, the interchangeable head of the present invention is a single vibrating head having a fixed ball on the applicator end that is driven by its flexible shaft. The fixed ball includes a preferably smooth surface manufactured from plastic or metal. The fixed ball is attached to a pivot whereby the flexible shaft causes the pivoting section to move back and forth in an arcing motion or path, when attached to the base unit and the motor is activated. Various vibration intensities can be selected by using the speed selector switch on the base unit. For example, on the high-speed setting the fixed ball can stimulate and soothe facial tissue. On the low-speed setting, the fixed ball can move in more of a tapping motion. The fixed ball is preferably attached to the pivot section by a threaded portion, thus allowing for different sizes of fixed balls. The interchangeable head of the present invention further includes one or more bent/extension portions that can be either extended or bent for massaging different facial contours and areas. The flexible shaft attaches to the pivot, thereby creating an arcing motion or path for the fixed ball.

In yet another embodiment of the present invention, an improved facial massager kit includes a base unit, one or more interchangeable heads, and an external battery charger. A plurality of interchangeable heads may be included in the kit to provide a variety of different massaging functions including a single rotary head, a dual rotary head and a single vibratory head. It is possible that other head configurations can be included within the kit, such as a dual vibrating head, temperature-controlled heads (having the ability to be stored in a freezer or heated under warm water prior to usage), small rotary ball heads, etc. The head attachment locations on the base unit and the interchangeable heads may include threads or snap fit connections to hold the two members together, thereby preventing relative motion between the two but also allowing the two members to be easily taken apart by a user so that another interchangeable head may be attached. The internal battery in the base unit can be recharged between uses by attaching the battery charger. The battery charger includes a charger connector that plugs into the battery charger port on the base unit.

The improved facial massager device of the present invention is particularly advantageous because it allows a user to perform a complete facial and neck massage in the comfort of their own home. The improved facial massager device comes in various configurations and may be manufactured from plastic or other materials in any color, based on a user's needs and/or desires and may include logos and other instructional decals without limitation. The improved facial massager kit comes with a plurality of interchangeable heads, thereby making it easy to use and adaptable to a variety of facial areas and contours.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

Figure 1:
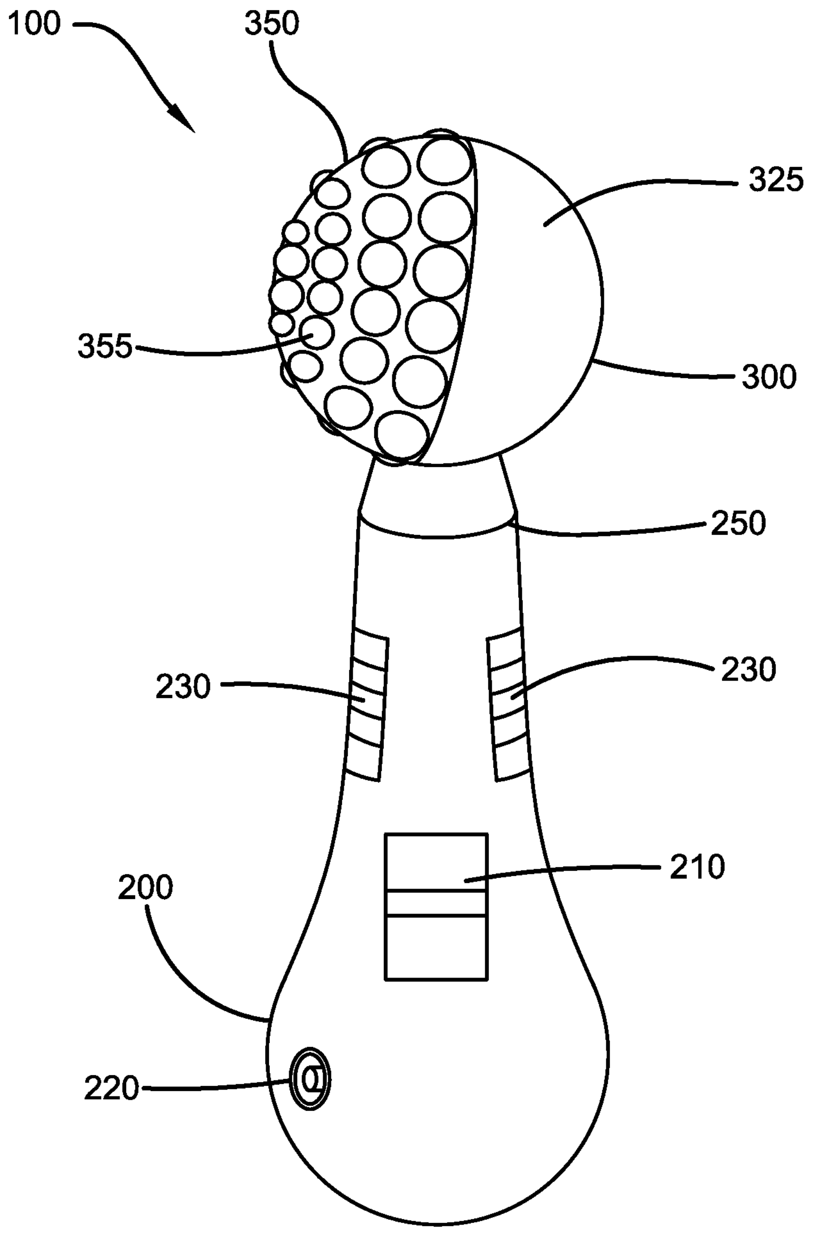
FIG. 1 illustrates a perspective view of one embodiment of the improved facial massager device of the present invention having a single rotary head attached to the base unit in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention, and do not limit the scope of the invention. Additionally, an illustrated embodiment need not have all the aspects or advantages shown. Thus, in other embodiments, any of the features described herein from different embodiments may be combined.

As noted above, there exists a long felt need in the art for an improved facial massager device that is handheld, and battery operated. There is also a long felt need in the art for an improved facial massager device that can be easily converted from one messaging head design to another, based on the desires and/or needs of a user. Additionally, there is a long felt need in the art for an improved facial massager device that can have interchangeable head covers having smooth, uneven or textured surfaces for providing different massaging effects. Further, there is a long felt need in the art for an improved facial massager device that can have differing head movements and intensities based on the desires and/or needs of a user. Further, there is a long felt need in the art for an improved facial massager device that is adjustable for the different facial contours and areas on a user's face and neck. Finally, there is a long felt need in the art for an improved facial massager device that is relatively inexpensive to manufacture, and that can be sold in a kit having a plurality of interchangeable heads and covers, along with a battery-operated handheld base.

The present invention, in one exemplary embodiment, is an improved facial massager device that is designed to be handheld, lightweight and battery operated. The improved facial massager device comprises a palm-sized base unit and one or more interchangeable heads. The base unit further comprises a motor, a rechargeable battery and switches/circuitry necessary for controlling the various massaging functions. Each interchangeable head is designed to attach to the base unit and to provide a specific type of motion, which is transferred to the interchangeable head via rotational motion generated by the base unit's motor. Each interchangeable head can be lengthened and adjusted to accommodate a variety of facial contours and areas. In addition, the novel interchangeable heads can have a single or dual head applicator. Each head applicator can also rotate based on a user's selection of the settings on the base unit. Further, each head applicator can include replaceable covers having smooth, raised or textured surfaces.

Referring initially to the drawings, FIG. 1 illustrates a perspective view of one embodiment of the improved facial massager device 100 of the present invention comprising a single rotary head 300 attached to the base unit 200. The base unit 200 further comprises a motor (not shown), a rechargeable battery (not shown) and electrical circuitry (not shown) necessary for controlling the various massaging functions. The base unit 200 comprises a speed selector switch 210 for manually controlling the speed of the internal motor. The different speed settings may include off, low, medium, high, etc. An external plug-in transformer charger 650 (shown in FIG. 6) can be attached to the battery charger port 220 on the base unit 200 for recharging the internal rechargeable battery. The base unit 200 can be manufactured from any suitable material known in the art including hard plastic, and may further include rubber finger grips 230 for holding the base unit 200 securely while using the novel improved facial massager device 100.

Figure 2:
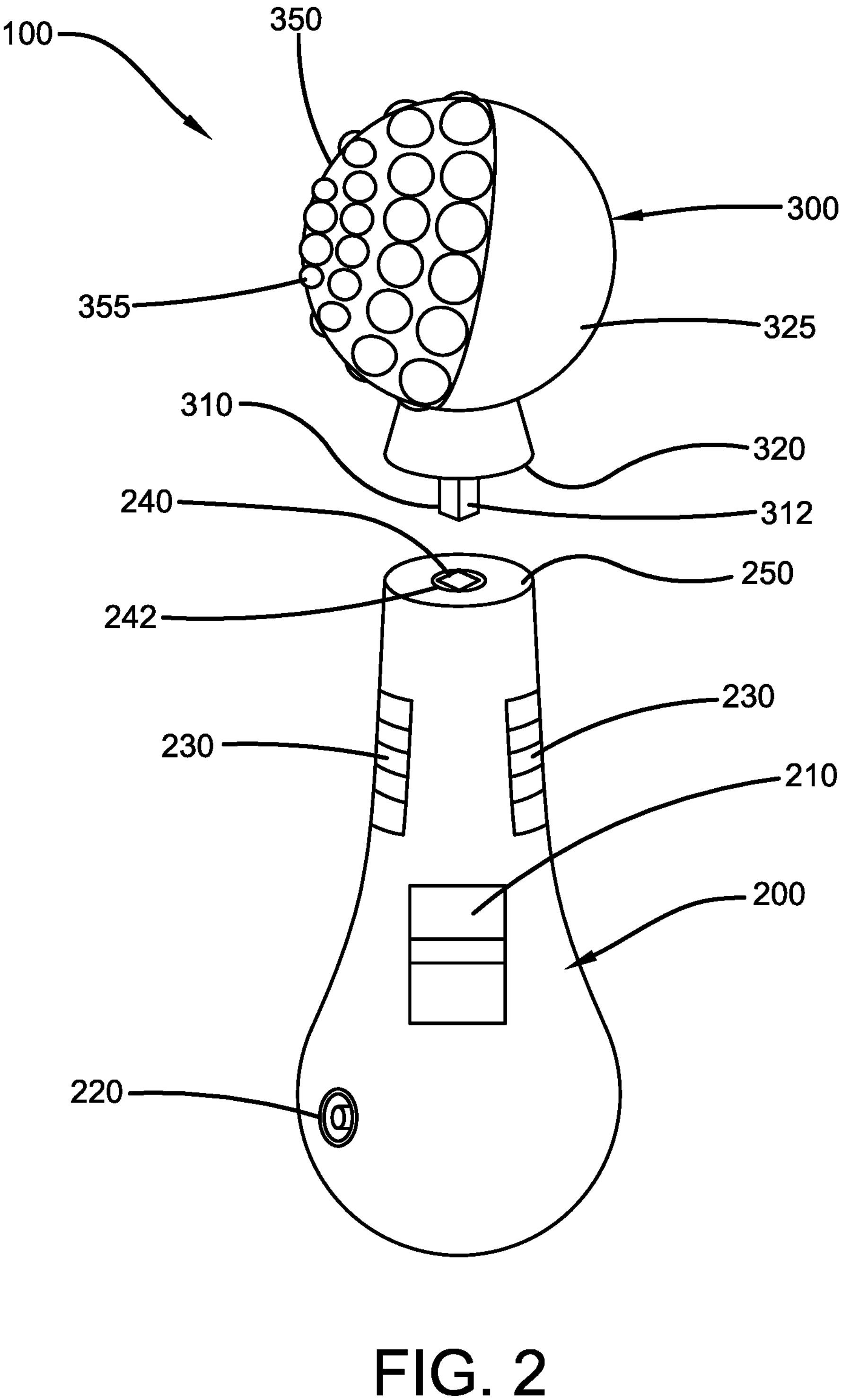
FIG. 2 illustrates a perspective exploded view of the embodiment of the facial massager device of the present invention having a single rotary head in accordance with the disclosed architecture.

The single rotary head 300 attaches to the base unit 200 at the head attachment location 250 and 320 on the base unit 200 and the single rotary head 300 respectively, as further described in FIG. 2. Additionally, the textured surface cap 350 comprises a textured surface 355 and is shown attached to the applicator end 325 of the single rotary head 300. The textured surface 355 may include spherical, ball-like features as shown, or may include other textures, raised or smooth, or any other suitable textures as is known in the art, and each of the textured surfaces 355 may also individually rotate or spin. The single rotary head 300 may be manufactured from hard plastic or metal, or any other suitable material as is known in the art.

FIG. 2 illustrates a perspective expanded view of one embodiment of the improved facial massager device 100 of the present invention. Referring to the descriptions and numbering from FIG. 1, the attachment of the base unit 200 and the single rotary head 300 (or other interchangeable heads of the present invention) will now be described. At the top end of the base unit 200, the head attachment location 250 includes a rotary spindle 240 having a square profile 242 for mating to a complimentary-sized and shaped flexible shaft 310, also comprising a square profile 312, on the single rotary head 300. The square profiles 242 and 312 allow rotational motion from the rotary spindle 240 to be transferred to the flexible shaft 310. Other complimentary profiles such as D-shaped or splines, etc., or any other suitable profile as is known in the art could be used as well. Traditional flexible shafts are well known in the art and are typically manufactured from metal cable or any other suitable material as is known in the art. Rotational motion is transferred from one end of the cable to the other end similar to that of a shaft or axle, however, since it is a metal cable it can be flexed or angled while still providing the rotational motion from one end to the other.

The head attachment location 250 on the base unit 200 and the head attachment location 320 on the single rotary head 300 or other interchangeable heads of the present invention may include threads or snap fit connections to hold the two members together, thereby preventing relative motion between the two, but also allowing the two members to be easily taken apart by a user so that another interchangeable head may be attached.

Figure 3:
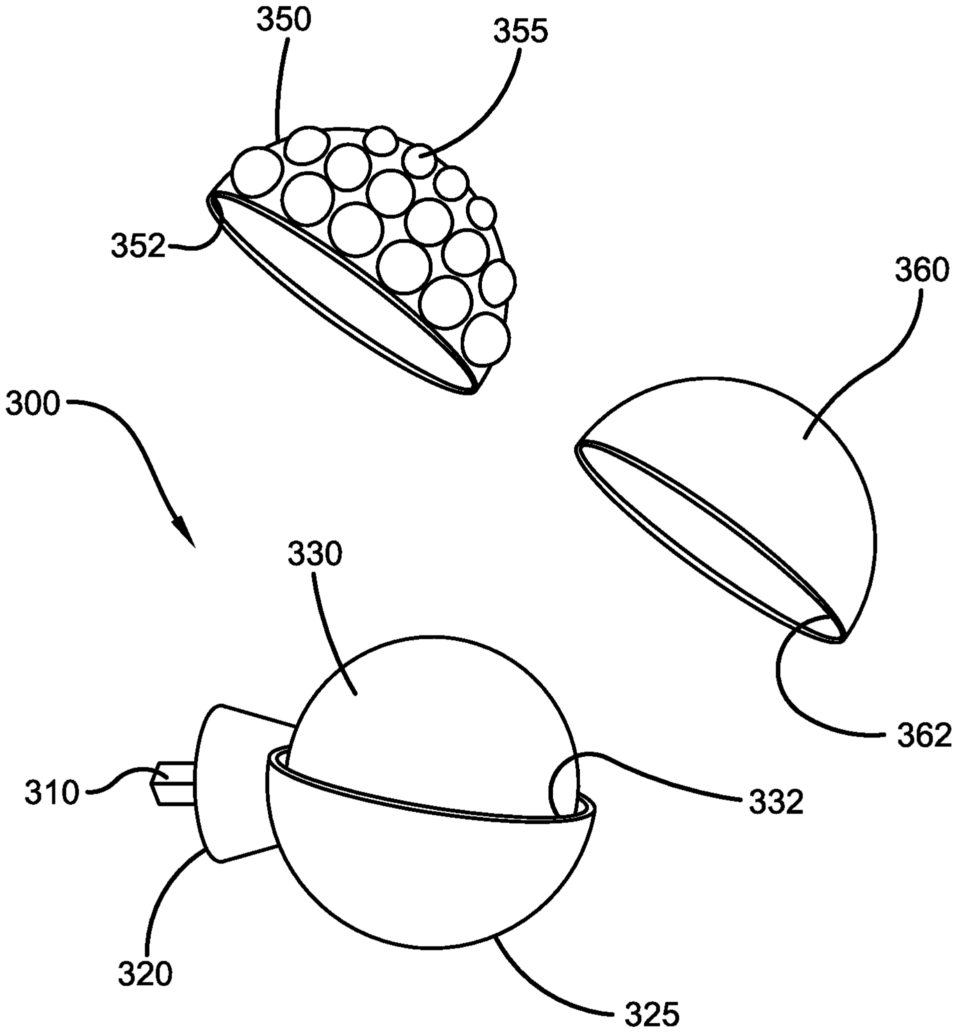
FIG. 3 illustrates a perspective view of the single rotary head of the present invention along with two replaceable caps in accordance with the disclosed architecture.

FIG. 3 illustrates a perspective view of the single rotary head of the present invention along with two replaceable cap options. In this embodiment, the interchangeable head of the present invention is a single rotary head 300 having a rotary ball 330 on the applicator end 325 which is driven by its flexible shaft 310. The rotary ball 330 includes a threaded portion 332 about its circumference for attaching a replaceable cap 350 or 360. The replaceable caps 350 and 360 also comprise a threaded portion 352 or 362, which mates with and is secured by the threaded portion 332 of the rotary ball 330. When the replaceable cap 350 or 360 is screwed onto the rotary ball 330, the rotary ball 330 and replaceable cap 350 or 360 will spin (or rotate) when the motor on the base unit 200 is activated. The replaceable cap 350 or 360 may include a variety of different surfaces including a textured surface 355 having spherical ball-like features as shown, smooth or raised surfaces, or any suitable surface feature as is known in the art, wherein each replaceable cap provides a different sensation and result for the user when using the improved facial massager device 100.

Figure 4A:
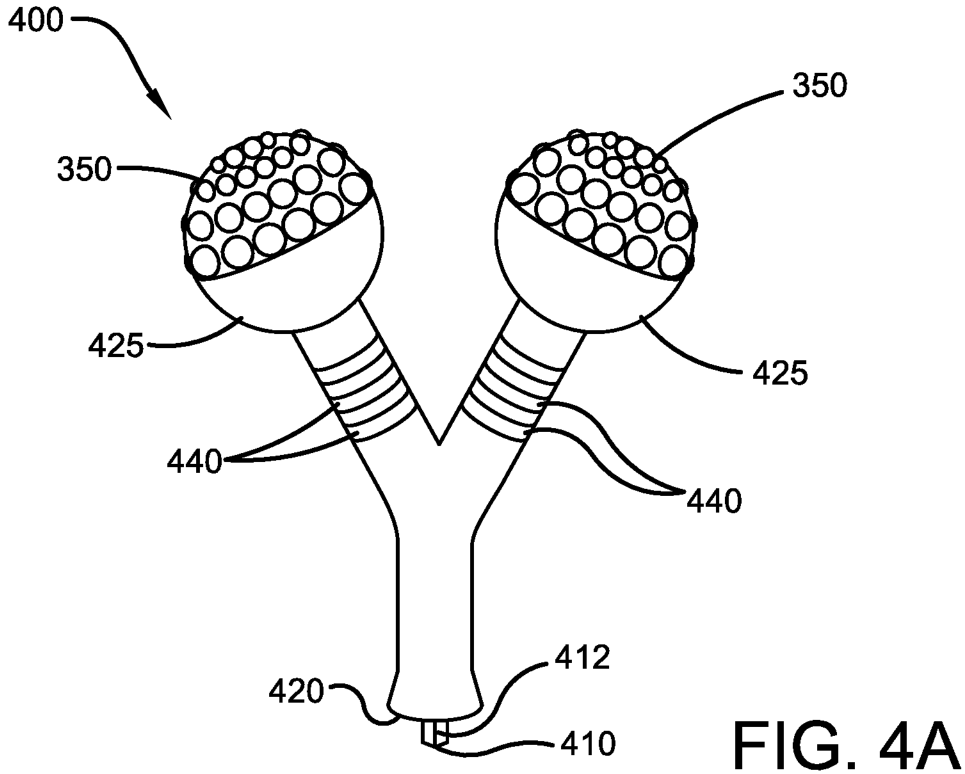
FIG. 4A illustrates a perspective view of another embodiment of the improved facial massager device of the present invention depicting a dual rotary head in accordance with the disclosed architecture.

FIG. 4A illustrates a perspective view of another embodiment of the improved facial massager device of the present invention depicting a dual rotary head 400 in a straightened orientation. The dual rotary head 400 comprises a rotary ball on each of the two applicator ends 425, which are both simultaneously driven by the flexible shaft 410. Each rotary ball, which is similar to rotary ball 330 in the single rotary head 300, includes a threaded portion about its circumference for attaching a replaceable cap (i.e., textured surface cap 350 is shown). The replaceable cap also comprises a threaded portion as well, to mate with and secure to the threaded portion of the rotary ball. When the replaceable caps are screwed onto the rotary balls, each rotary ball and replaceable cap will spin when the motor on the base unit 200 is activated. The replaceable caps may include a variety of different surfaces including smooth, uneven, or textured spherical ball-like features, etc., or any other suitable surface features as is known in the art, wherein each replaceable cap provides a different sensation and result for the user when using the improved facial massager device. Further, the dual rotary head 400 includes bend/extension portions 440 that are adjacent to each applicator end 425, and which allow for articulation of the device such that it can be either extended or bent for massaging different facial contours and areas. Each of the applicator ends 425 of the dual rotary head 400 are shown in FIG. 4A in a straight and contracted position. Additionally, the flexible shaft 410 of the dual rotary head 400 includes a square profile portion 412 for mating to the rotary spindle 240 the base unit 200. Additional flexible shafts and/or gear drives may be included to simultaneously drive both rotary balls.

Figure 4B:
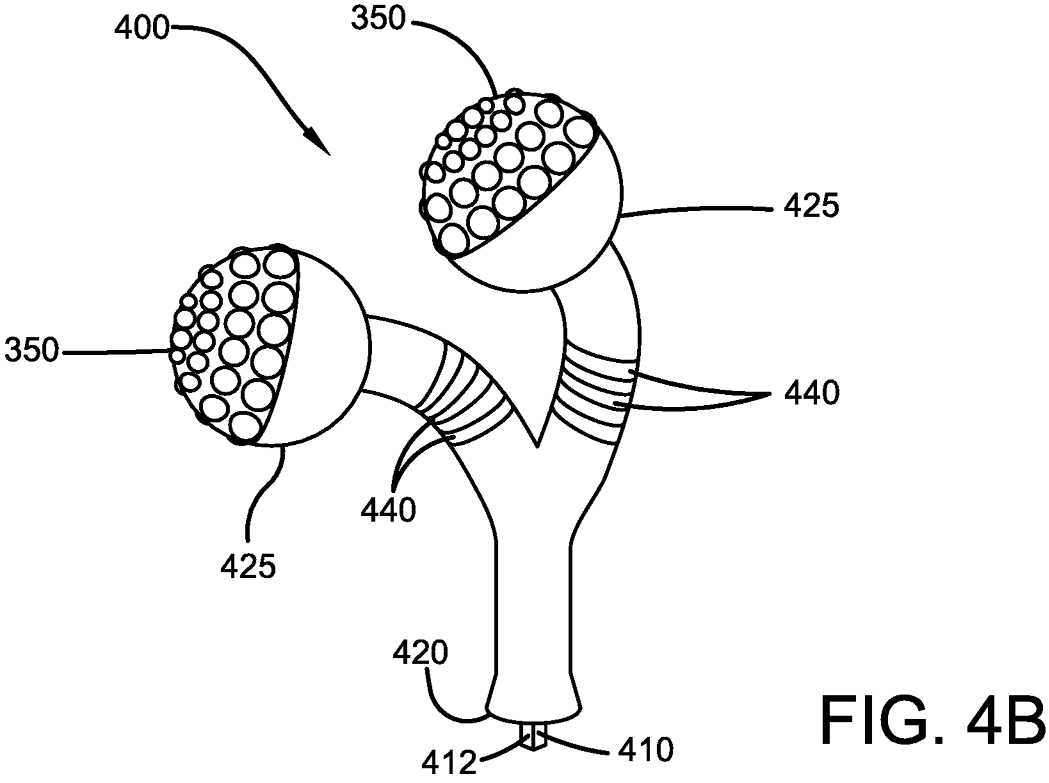
FIG. 4B illustrates a perspective view of another embodiment of the improved facial massager device of the present invention depicting a dual rotary head in a bent position in accordance with the disclosed architecture.

FIG. 4B illustrates a perspective view of one embodiment of the improved facial massager device of the present invention in a bent and extended orientation. Each of the applicator ends 425 of the dual rotary head 400 are shown in FIG. 4B in a bent and extended position. The applicator ends 425 can be independently positioned using the bend/extension (or articulated) 440 portions. The bend/extension 440 portions may be manufactured from plastic or metal, or any other suitable material as is known in the art, but may also made to be stretchable and bendable, thereby allowing each applicator end 425 to be either extended and/or bent for massaging different facial contours and areas.

Figure 5:
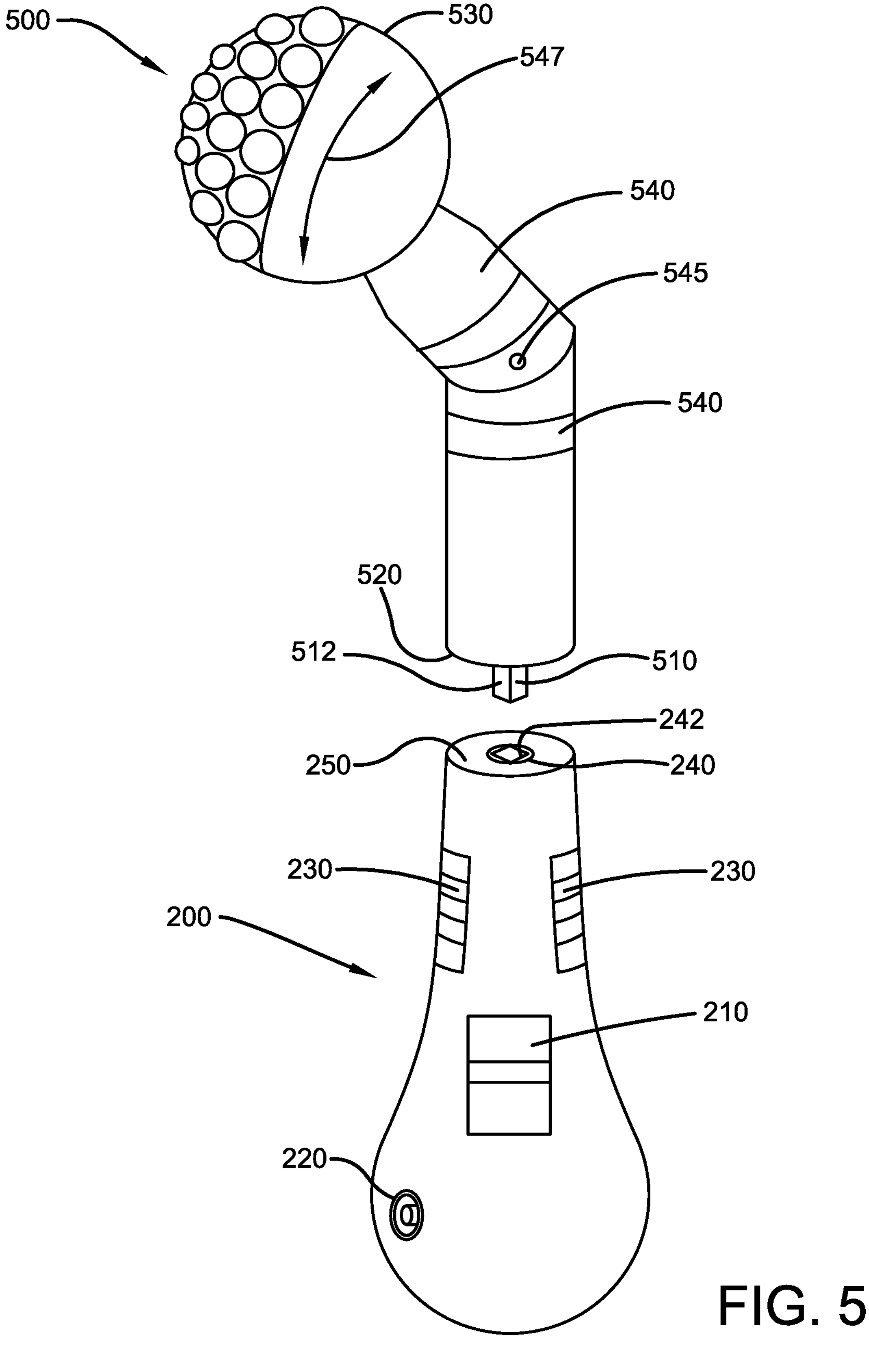
FIG. 5 illustrates a perspective exploded view of another embodiment of the improved facial massager device of the present invention having a single vibratory head and base unit in accordance with the disclosed architecture.

FIG. 5 illustrates a perspective expanded view of another embodiment of the improved facial massager device of the present invention having a single vibratory head 500 and the base unit 200. The single vibratory head 500 includes a fixed ball 530 on the applicator end which is driven by the flexible shaft 510. The fixed ball 530 preferably includes a smooth surface made from plastic or metal, or any other suitable material as is known in the art. The fixed ball 530 is attached to a pivot 545, whereby the flexible shaft 510 allows the pivoting section to move back and forth in an arcing motion or path 547 when attached to the base unit 200 and the motor is activated. Various vibration intensities can be selected by using the speed selector switch 210 on the base unit 200. For example, on the high-speed setting, the fixed ball 530 can stimulate and soothe facial tissue. On the low-speed setting, the fixed ball 530 can move in more of a tapping motion. The fixed ball 530 is preferably attached to the pivot section by a threaded portion (not shown), thus allowing for different sizes of fixed balls. The single vibratory head 500 of the present invention further includes one or more bend/extension portions 540 that can be either extended or bent for massaging different facial contours and areas. Further, the flexible shaft 510 comprises a square profile 512 for mating to the rotary spindle 240 of the base unit 200. Thus, the single vibratory head 500 attaches to the base unit 200 at the head attachment location 520 in a similar manner as previously described in the other embodiments.

Figure 6:
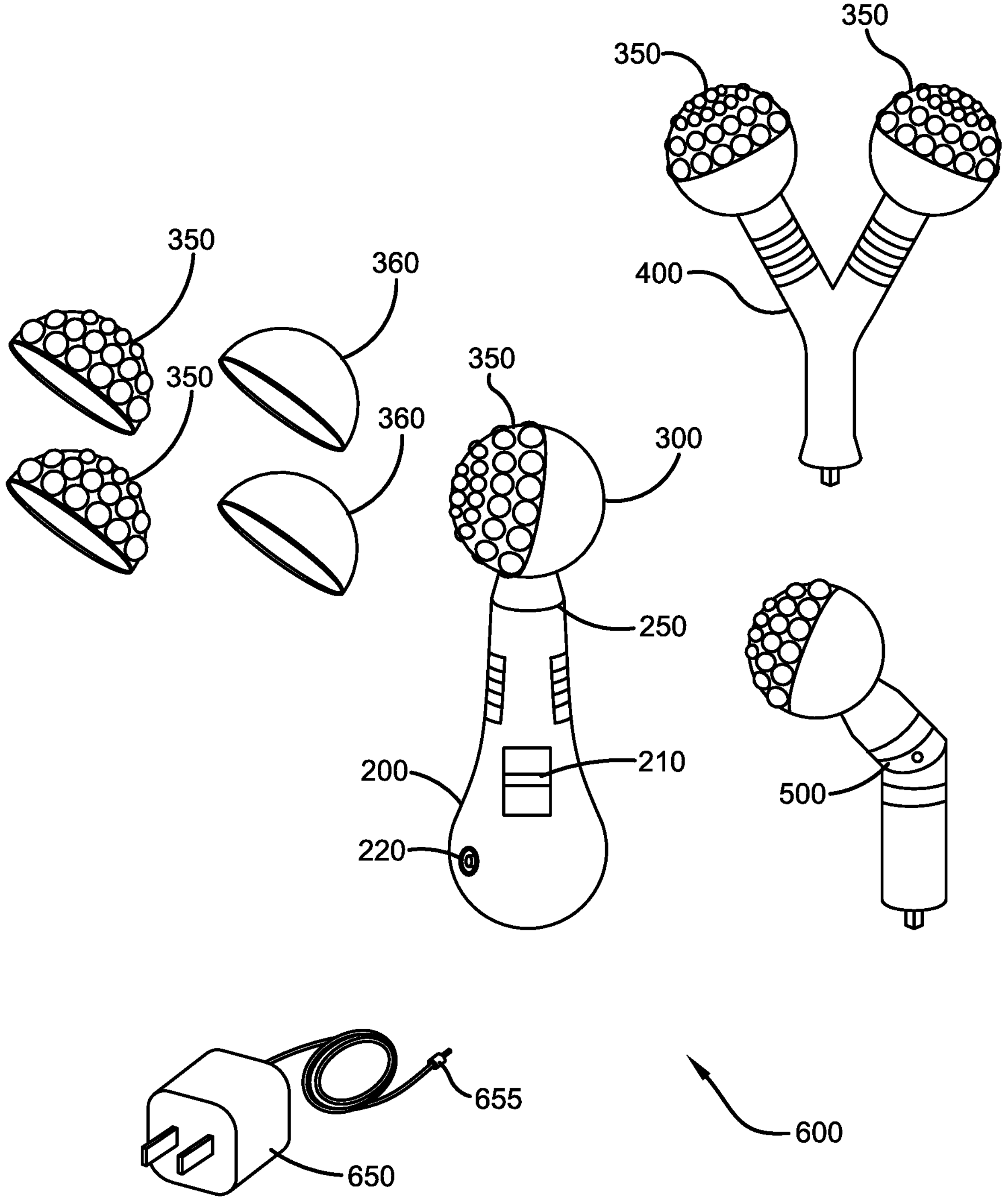
FIG. 6 illustrates a perspective view of another embodiment of the improved facial massager device of the present invention configured as a kit in accordance with the disclosed architecture.

FIG. 6 illustrates a perspective view of another embodiment of the improved facial massager device of the present invention configured as a kit. In another embodiment of the present invention, an improved facial massager kit 600 comprises a base unit 200, one or more interchangeable heads, several replaceable caps and an external battery charger 650. A plurality of interchangeable heads may be included in the kit to provide a variety of different massaging functions including a single rotary head 300, a dual rotary head 400 and a single vibratory head 500. It is possible that other head configurations could also be included within the kit, such as a dual vibratory head, temperature-controlled heads (having the ability to be stored in a freezer or heated under warm water prior to usage), small rotary ball heads, etc., or any other suitable head design as is known in the art. The internal battery in the base unit 200 can be recharged between uses by attaching the battery charger 650. The battery charger includes a charger connector 655 that plugs into the battery charger port 220 on the base unit 200, which is then plugged into a wall socket.

The head attachment locations on the base unit 200 and the interchangeable heads may both include threads or snap fit connections to hold the two members together, thereby preventing relative motion between the two but also allowing the two members to be easily taken apart by a user, so that another interchangeable head may be attached. Several replaceable caps including textured surface caps 350 and smooth surface caps 360, can be included in the kit as well for attachment to either the single rotary head 300 or the dual rotary head 400, based on the needs and/or wants of a user.

The improved facial massager device as depicted in the various embodiments and figures may be made available in different sizes, configurations, designs and colors to accommodate user need and/or preference, and the exact size, measurement, construction and design specifications of the improved facial massager device of the present invention may vary upon manufacturing or the particular material that is used. The improved facial massager device may further comprise logos, indicia, trademarks, geometric patterns, customizable colors and fonts, embroidery and prints and/or images on its surface.

Certain terms are used throughout the following description and claims to refer to particular features or components. As one skilled in the art will appreciate, different persons may refer to the same feature or component by different names. This document does not intend to distinguish between components or features that differ in name but not structure or function.

Notwithstanding the forgoing, the improved facial massager device of the present invention can be of any suitable size and configuration as is known in the art without affecting the overall concept of the invention, provided that it accomplishes the above-stated objectives. One of ordinary skill in the art will appreciate that the size, configuration and material of each of the improved facial massager devices as shown in FIG. 106 is for illustrative purposes only, and that many other sizes and designs of the improved facial massager are well within the scope of the present disclosure. Although the dimensions of each of the improved facial massager devices are important design parameters for user convenience, the improved facial massager device may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A facial massaging device comprising:
- a base unit comprising a motor, a rechargeable battery, electrical circuitry, and a plurality of rubber finger grip elements; and
- a rotary head secured to the base unit, wherein the rotary head is secured to the base unit at a head attachment location; and
- wherein the head attachment location comprises a rotary spindle having a square profile adapted for mating to a flexible shaft on the rotary head having a square profile complimentary to the rotary spindle; and
- wherein the square profile of the rotary spindle and the square profile of the flexible shaft allow rotational motion from the rotary spindle to be transferred to the flexible shaft; and
- wherein the rotary head comprises a surface cap attached to an applicator end of the rotary head; and
- wherein the surface cap comprises a plurality of textured surface elements that are each configured to individually rotate.

2. The facial massaging device of claim 1, wherein the base unit comprises a speed selector switch for controlling speed of motor.

3. The facial massaging device of claim 2, wherein speed settings include low, medium, and high.

4. The facial massaging device of claim 3, wherein the base unit comprises a battery charger port.

5. The facial massaging device of claim 4, wherein an external plug-in transformer charger is attached to the battery charger port for recharging the rechargeable battery.

6. The facial massaging device of claim 1, wherein the head attachment location of the base unit and the rotary head comprises snap fit connections to retain the rotary head on the base unit.

7. A facial massaging device comprising:
- a base unit comprising a motor, a rechargeable battery, and electrical circuitry; and
- a rotary head comprising an applicator end and a rotary ball, wherein the rotary ball is attached to the applicator end of the rotary head;
- wherein the rotary head is secured to the base unit at a head attachment location;
- wherein the head attachment location comprises a rotary spindle with a square profile for mating to a complimentary sized and shaped flexible shaft with a square profile on the rotary head; and
- wherein the square profile of the rotary spindle and the square profile of the flexible shaft allow rotational motion from the rotary spindle to be transferred to the flexible shaft; and
- wherein the rotary head articulates; and
- wherein a replaceable cap comprises a plurality of spherical ball-like features that are each configured to individually rotate; and
- wherein the rotary head comprises at least one extension portion configured to bend and reorientate the rotary head.

8. The facial massaging device of claim 7, wherein the rotary ball comprises a threaded portion about its circumference for attaching a replaceable cap.

9. The facial massaging device of claim 8, wherein the replaceable cap comprises a threaded portion which mates with and is secured by the threaded portion of the rotary ball.

10. The facial massaging device of claim 7, wherein the rotary ball is attached to a pivot section.

11. A facial massaging device comprising:
- a base unit comprising a motor, a rechargeable battery, electrical circuitry, and
- a plurality of rubber finger grip elements; and
- a pair of rotary heads each comprising an applicator end and a rotary ball, wherein the rotary ball is attached to the applicator end of each of the pair of rotary heads;
- wherein the pair of rotary heads are secured to the base unit at a head attachment location;
- wherein the head attachment location comprises a rotary spindle with a square profile for mating to a complimentary sized and shaped flexible shaft with a square profile on the pair of rotary heads;
- wherein the square profile of the rotary spindle and the square profile of the flexible shaft allow rotational motion from the rotary spindle to be transferred to the flexible shaft;
- wherein the rotary ball comprises a threaded portion about its circumference for attaching a replaceable cap with a textured surface;
- wherein the replaceable cap comprises a threaded portion which mates with and is secured by the threaded portion of the rotary ball; and
- wherein the pair of rotary heads comprise at least one extension portion for extending or bending the pair of rotary heads; and
- wherein each of the pair of rotary head is configured to move pivotally in an arcing path; and
- wherein the replaceable cap comprises a plurality of spherical ball-like features that are each configured to individually rotate; and
- wherein each rotary head further comprises at least one extension portion configured to bend and reorientate the respective rotary head.

12. The facial massaging device of claim 11, wherein the improved facial massager device is configured as a kit comprising the base unit, a plurality of interchangeable rotary heads, a plurality of replaceable caps, and an external battery charger.

* * * * *